United States Patent
Maenner

(10) Patent No.: US 8,784,094 B2
(45) Date of Patent: Jul. 22, 2014

(54) APPARATUS FOR DEMOLDING MOLDED PARTS

(75) Inventor: Hans-Peter Maenner, Freiburg (DE)

(73) Assignee: Otto Maenner Innovation GmbH, Bahlingen (DE)

( * ) Notice: Subject to any disclaimer, the term of this patent is extended or adjusted under 35 U.S.C. 154(b) by 0 days.

(21) Appl. No.: 13/879,520

(22) PCT Filed: Oct. 17, 2011

(86) PCT No.: PCT/EP2011/005204
§ 371 (c)(1),
(2), (4) Date: Apr. 15, 2013

(87) PCT Pub. No.: WO2012/048903
PCT Pub. Date: Apr. 19, 2012

(65) Prior Publication Data
US 2013/0216645 A1   Aug. 22, 2013

(30) Foreign Application Priority Data

Oct. 15, 2010 (DE) .......................... 10 2010 048 650

(51) Int. Cl.
*B29C 45/42* (2006.01)
*B29C 45/43* (2006.01)

(52) U.S. Cl.
USPC ................... 425/556; 425/437; 425/436 RM; 425/DIG. 60

(58) Field of Classification Search
USPC ........... 425/437, 436 RM, 444, 556, DIG. 60; 264/335
See application file for complete search history.

(56) References Cited

U.S. PATENT DOCUMENTS

| 2,289,671 | A | * | 7/1942 | McGinnis et al. | ............ | 425/183 |
| 2,759,221 | A | * | 8/1956 | Edwards | ........................ | 425/140 |
| 2,992,455 | A | * | 7/1961 | Salzman | ........................ | 425/562 |
| 3,408,689 | A | * | 11/1968 | Heiner | ........................... | 425/556 |

(Continued)

FOREIGN PATENT DOCUMENTS

| DE | 10152932 A1 | 5/2003 |
| JP | 2000025079 A | 1/2000 |
| JP | 2004155052 A | 6/2004 |

OTHER PUBLICATIONS

Moll, D: "Generelle Aussagen Gibt Es Nicht" [There are no general statements], Plastverarbeiter, Huetig GmbH, Heidelberg, DE, vol. 54, No. 5, May 1, 2003, pp. 56, 58, XP001154357—English translation.

(Continued)

*Primary Examiner* — Dimple Bodawala
*Assistant Examiner* — Emmanuel S Luk
(74) *Attorney, Agent, or Firm* — Laurence A. Greenberg; Werner H. Stemer; Ralph E. Locher

(57) ABSTRACT

A device removes molded parts from a mold cavity of a mold half of an injection molding machine. The device contains an ejection mechanism used to remove the molded parts from the mold cavity in an ejection direction. A receiving element is arranged in relation to the mold cavity in the ejection direction, the receiving element contains a receiving opening to which low pressure is applied. The receiving opening is connected to a supply opening of a chamber by a first line. The chamber contains a suction opening on a vertically arranged lateral wall, to which low pressure is applied.

11 Claims, 2 Drawing Sheets

(56) References Cited

U.S. PATENT DOCUMENTS

| | | | | |
|---|---|---|---|---|
| 3,852,011 A | * | 12/1974 | Maiocco | 425/547 |
| 3,986,811 A | * | 10/1976 | Gunnels, Jr. | 425/556 |
| 4,085,178 A | * | 4/1978 | McNeely et al. | 264/106 |
| 4,118,168 A | * | 10/1978 | Rees et al. | 425/556 |
| 4,151,236 A | * | 4/1979 | Ryder | 264/39 |
| 4,295,815 A | * | 10/1981 | Eltvedt | 425/556 |
| 4,715,806 A | * | 12/1987 | Ehrler et al. | 425/553 |
| 4,719,059 A | * | 1/1988 | Braun et al. | 264/40.1 |
| 4,741,687 A | * | 5/1988 | Eltvedt | 425/441 |
| 4,904,441 A | * | 2/1990 | Sorensen et al. | 376/101 |
| 4,976,900 A | * | 12/1990 | Tsutsumi | 264/39 |
| 4,981,634 A | * | 1/1991 | Maus et al. | 264/102 |
| 5,015,425 A | * | 5/1991 | Mimata et al. | 264/39 |
| 5,075,051 A | | 12/1991 | Ito et al. | |
| 5,141,430 A | * | 8/1992 | Maus et al. | 425/556 |
| 5,935,511 A | * | 8/1999 | Brown | 264/551 |
| 5,948,341 A | * | 9/1999 | Diamond et al. | 264/335 |
| 6,322,116 B1 | * | 11/2001 | Stevens | 294/64.3 |
| 6,334,766 B1 | * | 1/2002 | McCormick | 425/165 |
| 6,386,850 B1 | * | 5/2002 | Salerno et al. | 425/112 |
| 6,648,626 B1 | * | 11/2003 | Eltvedt | 425/436 R |
| 7,097,444 B2 | * | 8/2006 | Hartley | 425/436 R |
| 8,308,472 B2 | * | 11/2012 | Heinz | 425/444 |
| 2004/0224050 A1 | | 11/2004 | Hechtl | |
| 2005/0208174 A1 | * | 9/2005 | Hartley | 425/556 |

OTHER PUBLICATIONS

Moll, D., "Generelle Aussagen gibt es nicht", Plasterverarberiter, 2003, pp. 56-57, vol. 54., No. 5 URL: http://www.stamm.ch/downloads/handling.pdf.

* cited by examiner

APPARATUS FOR DEMOLDING MOLDED PARTS

BACKGROUND OF THE INVENTION

Field of the Invention

The invention relates to an apparatus for demolding molded parts from a mold cavity of a mold half of an injection molding machine comprising an ejection device by means of which the molded parts can be demolded from the mold half in one direction of ejection, wherein a receiving element is arranged opposite the mold half in the ejection direction and comprises a receiving opening which can be subjected to low pressure.

An apparatus for demolding molded parts from a mold half of an injection mold having at least one axially adjustable plunger, a free end of which can extend through an ejection opening arranged in the mold half, is sufficiently known in the prior art as same is regularly used in injection molding machines.

In the known apparatus, after being ejected from the mold half, the molded part is received by a collecting pan disposed below the mold half. This is particularly problematic with small delicate molded parts since they are very light and can be blown away due to external influences, whereby they miss the collecting pan. Therefore, using a robot having a suction cup on its arm to remove particularly small and light molded parts from the mold half is also known. However, this is very laborious and thus expensive.

An apparatus for demolding molded parts from a mold half of an injection molding machine which has an axially adjustable plunger with a free end which can extend through an ejection opening arranged in the mold half is further known from DE 101 52 932 A1. A receiving element arranged on a lever pivotable by means of a pivoting mechanism can be positioned in the plunger's direction of movement opposite its free end.

The receiving element comprises a receiving opening which can be subjected to low pressure. The pivoting mechanism, the receiving element and the counter support arranged thereon are, however, relatively complex.

BRIEF SUMMARY OF THE INVENTION

It is the object of the invention to design an apparatus of the type specified above in such a manner that small and light molded parts in particular can be readily and reliably demolded.

This object is accomplished by the receiving opening being connected to a feed opening of a chamber via a first line, said chamber having a suction opening which can be subjected to low pressure on a vertically disposed side wall.

Because a receiving element having a receiving opening which can be subjected to low pressure is arranged opposite the mold cavity in the ejection direction, the molded part ejected from the mold half can be received by the receiving element. The low pressure exerts a suction on the molded part, whereby it enters the receiving opening. The molded part is thus no longer subject to free fall such that rough environmental conditions no longer have any impact on the molded part. As soon as they are in the receiving element, they can be reliably transferred. The suction exerted on the molded part particularly achieves detaching molded parts which for example stick to the mold half due to static charge.

The suction opening subjectable to low pressure allows removing molded parts from the airflow which guided them into the chamber. The airflow velocity is decreased by the larger volume or tan chamber, whereby the molded parts can be ejected from the airflow. The force of gravity causes them to fall downward essentially perpendicularly.

Arranging a filter in the chamber in front of the suction opening has, proven advantageous. Doing so achieves that molded parts unable to exit out of the airflow and still in said airflow will nevertheless remain in the chamber.

An embodiment of the invention in which the chamber exhibits a lower wall with a discharge opening arranged therein is very advantageous. Since molded parts outside of the airflow fall downward perpendicularly, they exit the chamber through the discharge opening so that they can be received and transported for further use.

The filter advantageously encloses the area between the feed opening and the discharge opening. Doing so thereby ensures that all molded parts end up in the discharge opening. Because the filter can be arranged such that its inner contour corresponds to the edge of the discharge opening. For example, if the discharge opening is of circular configuration, the filter should be cylindrical, whereby the maximal inner diameter of the cylinder corresponds to the diameter of the circular discharge opening.

A further particular embodiment of the invention in which the suction opening is connected to the outlet tube of a Venturi nozzle has also proven very advantageous. Doing so thereby enables easily generating a low pressure. Because compressed air which can be used to supply the Venturi nozzle is virtually always present in a machine for the purpose of operating pneumatic cylinders. Interval-based low pressure can moreover be easily generated. All that is needed to do so is intermittently operating a valve arranged in the feed line of the Venturi nozzle.

In an appropriate design of the invention, the ejection device comprises at least one axially adjustable plunger, a free end of which can extend through an ejection opening arranged in the mold half, wherein the receiving element is arranged opposite the free end of the plunger in the direction of movement. Such an ejection device is preferentially used for larger molded parts.

In another advantageous configuration of the invention, the election device comprises at least one fluid channel connected to the mold cavity which can be subjected to a pressurized fluid to eject the molded parts. This allows the gentle demolding particularly of small molded parts. Compressed air is preferably used as the fluid. If needed, the outlet ends of the fluid channel can be sealed by means of adjustable sealing means.

Further details, features and advantages of the present invention will yield from the following description of embodiments making reference to the drawings, which show:

DESCRIPTION OF THE INVENTION

Figure 1:
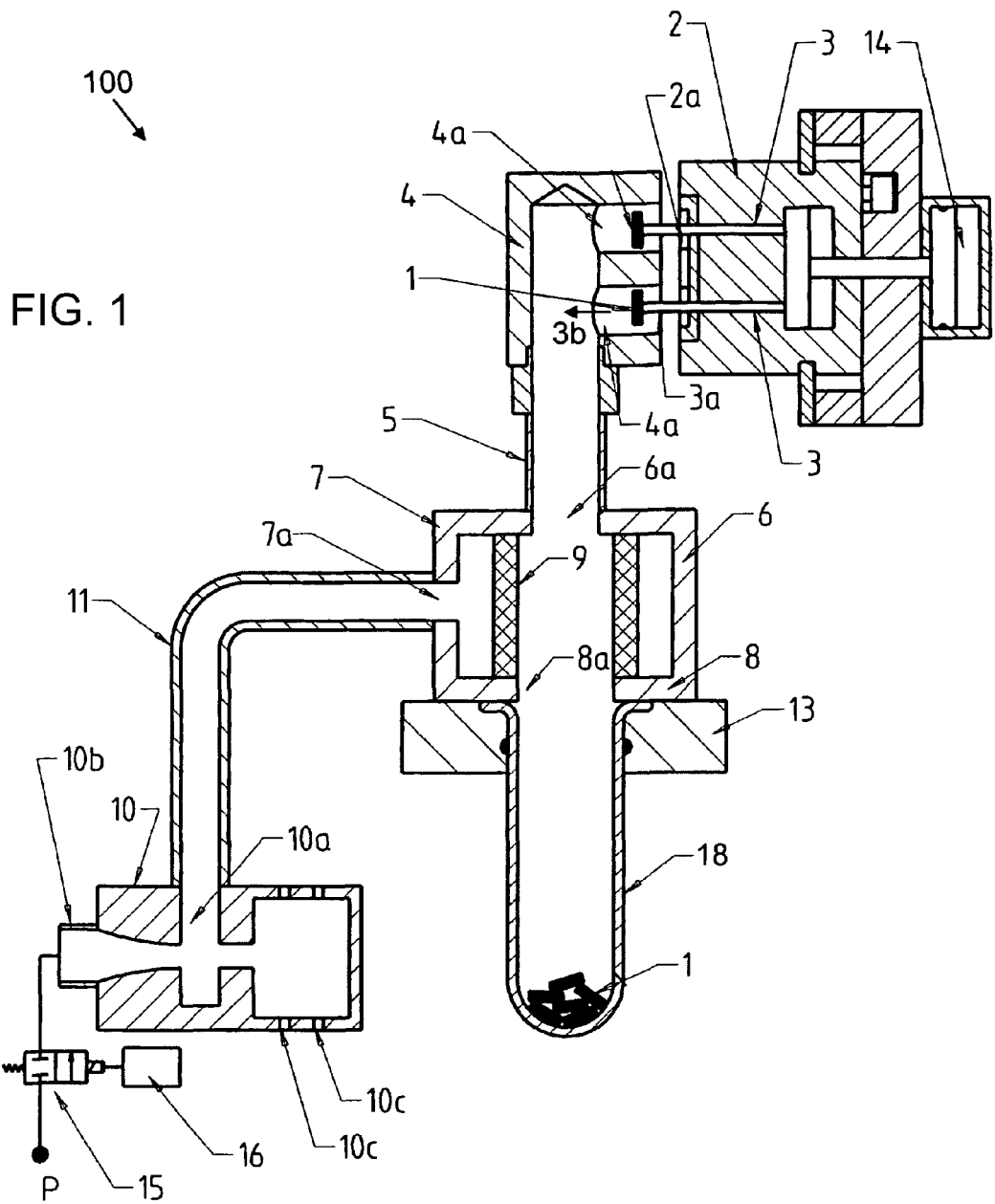
FIG. 1 a schematic depiction of an inventive apparatus comprising ejector pins, and FIG. 2 a schematic depiction of an inventive apparatus comprising a pneumatic ejection device.

As can be noted from FIG. 1, an apparatus designated as a whole by 100 for demolding molded parts 1 comprises a mold half 2 having a mold cavity 2a in which two molded parts 1 are situated subsequent an injection molding process. The molded parts 1 are ejected out of the mold cavity 2a in an ejection direction 3b by means of an ejection mechanism comprising plungers 3 actuatable via a pneumatic cylinder 14. The free ends 3a of the plungers 3 extend through an ejection opening arranged in the mold half 2.

A receiving element 4 is arranged in the direction of adjustment of the plungers 3 opposite the free ends 3a of the plungers 3. The receiving element 4 has two openings 4a which are connected to an opening 6a arranged in an upper wall of chamber 6 via a first line 5. The receiving element 4 is disposed such that the free ends 3a of the plungers 3, and thus molded parts 1, are located in the openings 4a of the receiving element 4 upon the actuation of the pneumatic cylinder 14. This is the position which is depicted in the figure.

The chamber 6 comprises a suction opening 7a on a vertical wall 7 which is connected to the outlet tube 10a of a Venturi nozzle 10 via a second line 11. The chamber 6 further comprises a lower wall 8 in which a discharge opening 8a is arranged.

A cylindrical filter 9 is arranged between the upper wall of the chamber 6 and the lower wall 8 of the chamber 6. The inner diameter of the filter 9 corresponds to the diameter of the dis-charge opening 8a arranged on the lower wall 8 of chamber 6 or is smaller than the diameter of the discharge opening 8a.

A test tube 12 is disposed below the discharge opening 8a of chamber 6. The test tube 12 is situated in a disk 13 of revolver-type configuration such that a respective test tube 12 disposed below the discharge opening 8a can be easily replaced by another test tube.

The Venturi nozzle 10 exhibits a feed line 10b in which a pneumatic valve 15 actuatable by a controller 16 is arranged. Compressed air can thus thereby be intermittently supplied to the Venturi nozzle. The Venturi nozzle 10 further comprises discharge openings 10c through which the compressed air supplied to the Venturi nozzle 10 through its feed line 10b can escape.

When compressed air is supplied to the Venturi nozzle 10, a suction is generated in the outlet tube 10a of the Venturi nozzle 10 which extends through the second line 11 to the suction opening 7a of the chamber 6. The low pressure further extends to the receiving openings 4a of the receiving element 4 through the first line 5 connected to the feed opening 6a of the chamber 6. Thus, molded parts 1 brought into the receiving openings 4a by means of the plungers 3 of the pneumatic cylinder 14 are sucked into the chamber 6. Due to the extension of the volume of the airflow in the chamber 6, the suction applied to the molded parts 1 is reduced such that the molded parts 1 fall through the discharge opening 8a into the test tube 12 due to the force of gravity. Molded parts still under suction reach the wall of the filter.

Because the Venturi nozzle 10 is supplied with compressed air at intervals, the suction applied to the molded parts 1 also occurs at intervals. The suction applied to the molded parts 1 in the chamber hereby experiences lulls during which the molded parts hanging on filter 9 can disengage from the filter 9 and fall into the test tube 12. Because the inner diameter of the filter 9 corresponds to the diameter of the discharge opening 8a, there are no edges in the path of the molded parts so that they will all fall into the test tube 12.

Figure 2:
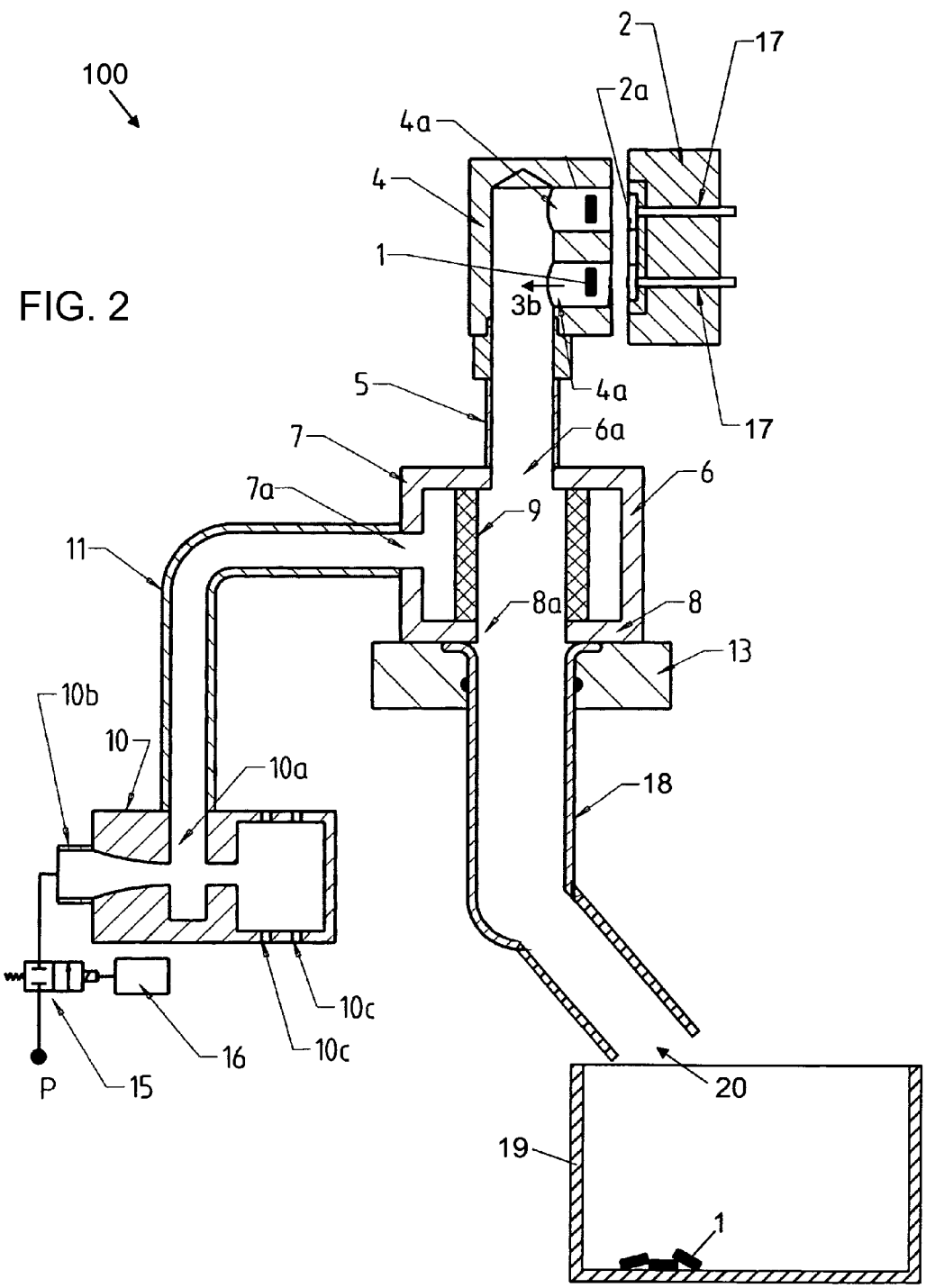

In the embodiment depicted in FIG. 2, the ejection device exhibits fluid channels 17 connected to the mold cavity 2a which penetrate through the mold half 2; their free ends facing the receiving opening 4a.

On their remote ends from the mold cavity 2a, the fluid channels 17 are connected to a source of compressed air not shown in greater detail in the figure) by means of which compressed air can be blown into the mold cavity 2a to eject the molded part 1 from the mold cavity 2a. The molded parts 1 are ejected out of the mold cavity 2a in ejection direction 3b by the compressed air and conveyed into receiving opening 4a.

In the embodiment shown in FIG. 2, the discharge opening 8a is connected to a receptacle 19 for the molded parts 1 via a transport channel 18. At an end situated at a distance from the receiving opening 8a, the transport channel 18 exhibits an outlet opening 20 arranged above the receptacle 19 at which the molded parts 1 exit the transport channel and fall into the receptacle 19.

The invention claimed is:

1. An apparatus for demolding molded parts from a mold cavity of a mold half of an injection molding machine, the apparatus comprising:
   an ejection device for demolding the molded parts from the mold cavity in an ejection direction;
   a receiving element having a receiving opening formed therein being subjected to low pressure and disposed opposite the mold cavity in the ejection direction;
   a first line;
   a chamber having a vertically disposed side wall and a feeding opening formed therein and connected to said receiving opening via said first line, said vertically disposed side wall having a suction opening formed therein and being subjected to low pressure, said chamber further having a lower wall with a discharge opening formed therein; and
   a filter disposed in said chamber in front of said suction opening.

2. The apparatus according to claim 1, wherein said filter encloses an area between said feed opening and said discharge opening.

3. The apparatus according to claim 2, wherein said filter is disposed such that an inner contour of said filter corresponds to an edge defining said discharge opening.

4. The apparatus according to claim 1, further comprising:
   a transport channel; and
   a receptacle for receiving the molded parts, said discharge opening of said chamber connected to said receptacle via said transport channel.

5. The apparatus according to claim 1, further comprising a Venturi nozzle connected about said suction opening.

6. The apparatus according to claim 1, further comprising a device by means of which low pressure can be generated at intervals.

7. The apparatus according to claim 1, wherein said ejection device contains at least one axially moveable plunger, said axially moveable plunger having a free end extending through an ejection opening arranged in the mold half, and said receiving element is disposed opposite said free end of said axially moveable plunger in a direction of adjustment of said axially moveable plunger.

8. The apparatus according to claim 1, wherein said ejection device contains at least one fluid channel connected to the mold cavity which can be subjected to a pressurized fluid to eject the molded parts.

9. The apparatus according to claim 1, wherein said chamber exhibits a larger cross section than said first line, whereby a velocity of an airflow channeled in said chamber is decreased.

10. The apparatus according to claim 5,
    further comprising a second line; and
    wherein said Venturi nozzle has an outlet tube and suction is generated in said outlet tube which extends through said second line to said suction opening of said chamber as well as to said receiving opening of said receiving element through said first line connected to said feed opening of said chamber.

11. The apparatus according to claim 10, wherein the suction is applied to the molded parts in intervals.

* * * * *